United States Patent
Yamamoto

(10) Patent No.: US 9,538,033 B2
(45) Date of Patent: Jan. 3, 2017

(54) IMAGE FORMING APPARATUS AND IMAGE FORMING METHOD

(71) Applicant: KYOCERA Document Solutions Inc., Osaka-shi, Osaka (JP)

(72) Inventor: Takenori Yamamoto, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/869,842

(22) Filed: Sep. 29, 2015

(65) Prior Publication Data

US 2016/0094745 A1 Mar. 31, 2016

(30) Foreign Application Priority Data

Sep. 30, 2014 (JP) ................. 2014-200469

(51) Int. Cl.
  *G06K 15/00* (2006.01)
  *H04N 1/00* (2006.01)
  *G06F 3/12* (2006.01)
  *H04N 1/32* (2006.01)

(52) U.S. Cl.
  CPC ........ *H04N 1/00708* (2013.01); *G06F 3/1296* (2013.01); *H04N 1/00771* (2013.01); *H04N 1/32625* (2013.01); *H04N 2201/0094* (2013.01)

(58) Field of Classification Search
  USPC ....................................... 358/1.14
  See application file for complete search history.

(56) References Cited

U.S. PATENT DOCUMENTS

| | | | | | |
|---|---|---|---|---|---|
| 5,237,379 | A | * | 8/1993 | Sklut | G03G 15/5095 399/376 |
| 2012/0300225 | A1 | * | 11/2012 | Scrafford | G06K 15/1823 358/1.2 |
| 2014/0036289 | A1 | * | 2/2014 | Muroi | H04N 1/21 358/1.13 |
| 2015/0071672 | A1 | * | 3/2015 | Kubota | G03G 15/502 399/81 |

FOREIGN PATENT DOCUMENTS

| | | |
|---|---|---|
| JP | 62154847 U | 10/1987 |
| JP | H05147304 A | 6/1993 |

(Continued)

OTHER PUBLICATIONS

Japan Patent Office, Office Action Issued in Application No. 2014-200469, Aug. 17, 2016, 3 pages.

*Primary Examiner* — Jerome Grant, II
(74) *Attorney, Agent, or Firm* — Alleman Hall McCoy Russell & Tuttle LLP

(57) ABSTRACT

A sheet size determining portion determines, upon start of execution of a print job, whether or not a sheet size corresponding to raster image data to be printed in the print job matches a sheet size of a sheet conveyed in the print job. A size error detecting portion determines, in a case where the sheet size corresponding to the raster image data does not match the sheet size of the sheet, whether or not a print pixel to be printed exists in an excess region of the raster image data that is outside the sheet size of the sheet. A printing portion continues execution of the print job in a case where no print pixel exists in the excess region and stops the print job in a case where the print pixel exists in the excess region.

6 Claims, 6 Drawing Sheets

(56) References Cited

FOREIGN PATENT DOCUMENTS

| | | | | |
|---|---|---|---|---|
| JP | 08087204 A | | 4/1996 | |
| JP | 09249338 A | | 9/1997 | |
| JP | 2004-330602 | * | 11/2004 | ............... G06F 3/12 |
| JP | 2007034957 A | | 2/2007 | |
| JP | 2008197803 | * | 8/2008 | ............... G06F 3/12 |
| JP | 2011237564 A | | 11/2011 | |
| JP | 2014144538 A | | 8/2014 | |

* cited by examiner

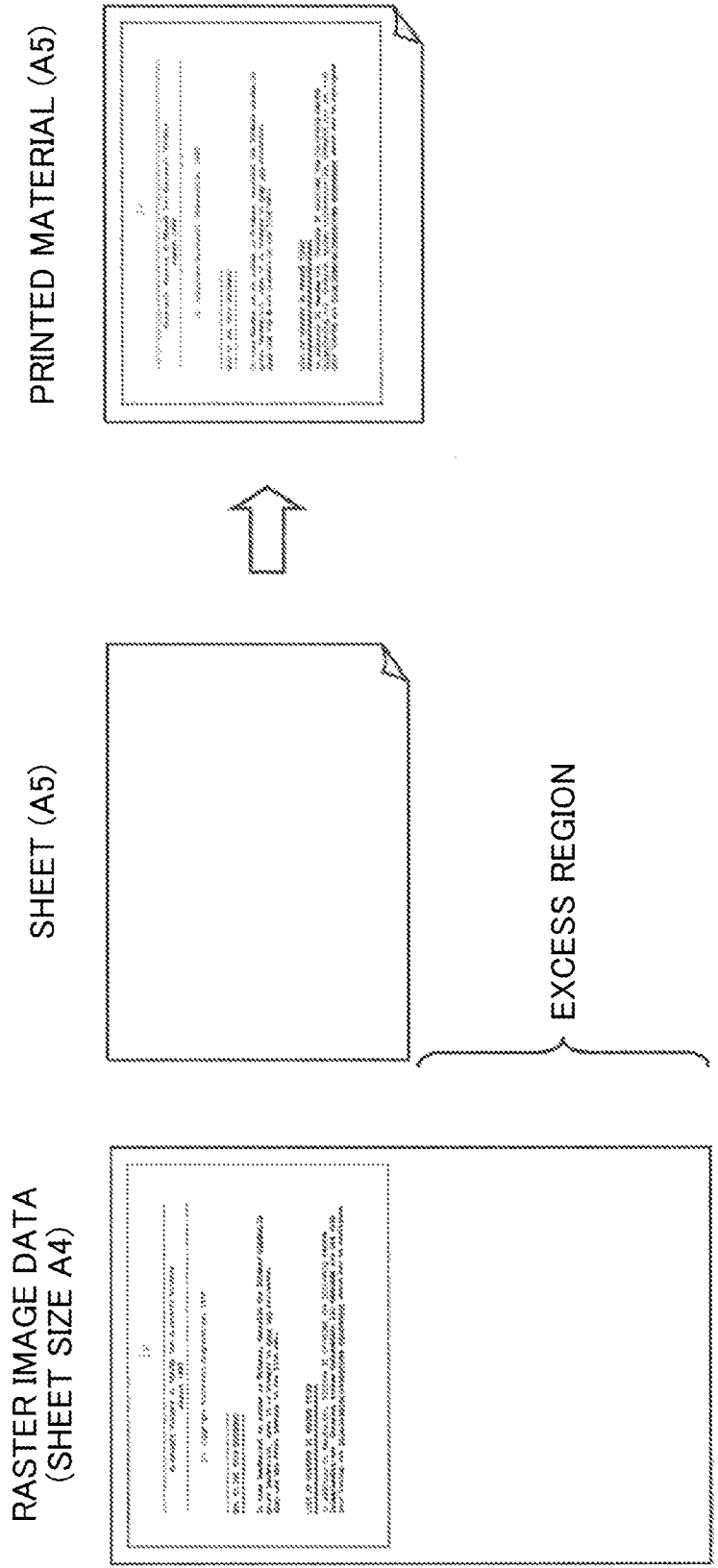

IMAGE FORMING APPARATUS AND IMAGE FORMING METHOD

INCORPORATION BY REFERENCE

This application is based upon and claims the benefit of priority from the corresponding Japanese Patent Application No. 2014-200469 filed on Sep. 30, 2014, the entire contents of which are incorporated herein by reference.

BACKGROUND

The present disclosure relates to an image forming apparatus and an image forming method.

Conventionally, a technique of collating the size of image data of a read document with the size of a sheet for image formation and then outputting an error when the size of the image data does not match the size of the sheet is employed in an image forming apparatus such as a copy machine, a printer, or a multifunction peripheral.

For example, the following technique is known as a related technique used in an image forming apparatus. Specifically, a sheet feeding time is measured by using an optical sensor provided on a sheet conveyance path. Next, the size of a sheet that is actually fed is calculated on the basis of the sheet feeding time and a sheet conveyance speed. Then, in a case where the size of this sheet does not match a set sheet size, it is determined that a sheet size error has occurred.

As another related technique, a printer that stops printing in a case where it is determined that a sheet size error has occurred is known. As a still another related technique, an image forming apparatus that automatically redoes printing by issuing, upon occurrence of a sheet size error, a print request in which a sheet size judged an error is used as a print output size so that the print output size matches the actual printing size is known. As a still another relevant technique, an image forming apparatus that allows a user to select, upon occurrence of a sheet size error, whether to cancel a state where printing has been stopped or to confirm the state is known.

SUMMARY

An image forming apparatus according to one aspect of the present disclosure includes a sheet size determining portion, a size error detecting portion, and a printing portion. The sheet size determining portion determines, upon start of execution of a print job, whether or not a sheet size corresponding to raster image data to be printed in the print job matches a sheet size of a sheet conveyed in the print job. The size error detecting portion determines, in a case where the sheet size corresponding to the raster image data does not match the sheet size of the sheet, whether or not a print pixel to be printed exists in an excess region of the raster image data that is outside the sheet size of the sheet. The printing portion continues execution of the print job in a case where no print pixel exists in the excess region and stops the print job in a case where the print pixel exists in the excess region.

An image forming method according to another aspect of the present disclosure includes first through fourth steps. In the first step, upon start of execution of a print job, it is determined whether or not a sheet size corresponding to raster image data to be printed in the print job matches a sheet size of a sheet conveyed in the print job. In the second step, it is determined, in a case where the sheet size corresponding to the raster image data does not match the sheet size of the sheet, whether or not a print pixel to be printed exists in an excess region of the raster image data that is outside the sheet size of the sheet. In the third step, execution of the print job is continued in a case where no print pixel exists in the excess region. In the fourth step, the print job is stopped in a case where the print pixel exists in the excess region.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6A is a diagram illustrating a relation between raster image data and a sheet in a case where no sheet size error occurs.

DETAILED DESCRIPTION

Figure 1:
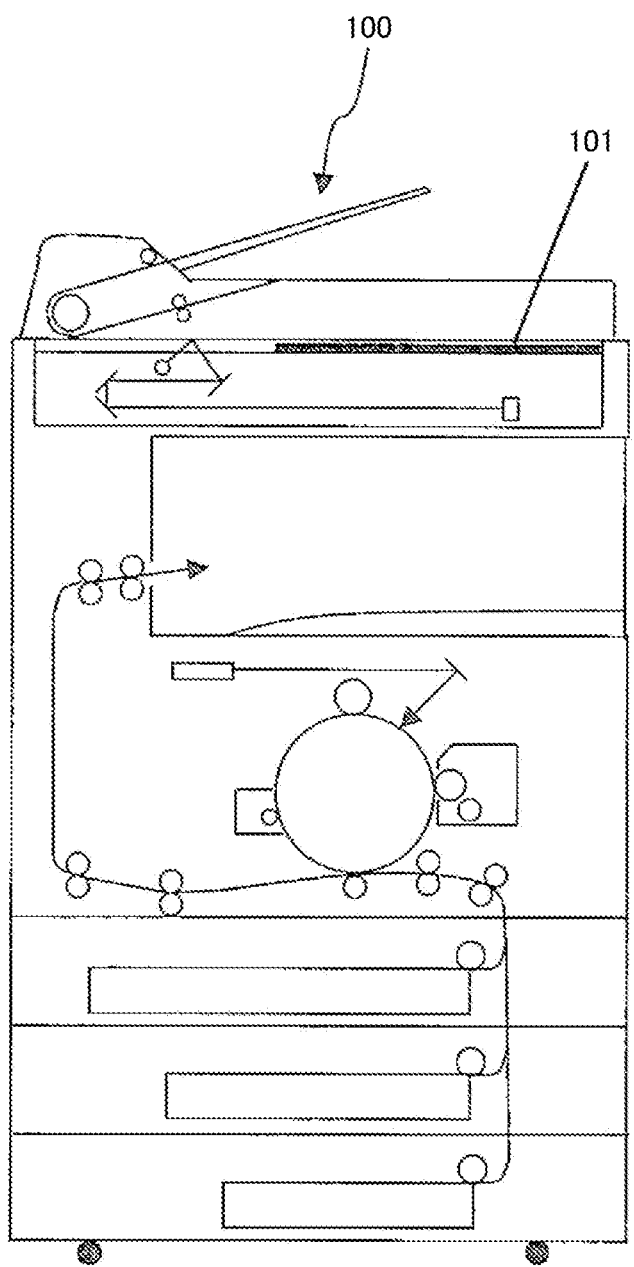
FIG. 1 is a diagram schematically illustrating an outline of a multifunction peripheral according to an embodiment of the present disclosure.

Hereinafter, an embodiment of the present disclosure will be described for understanding of the present disclosure with reference to the drawings. It should be noted that the embodiment below is a specific example of the present disclosure and do not limit the technical scope of the present disclosure. It should also be noted that the alphabet "S" before a numeral in the flow chart denotes "step".

A recent trend toward lower prices of image forming apparatuses has led to a reduction in the number of functions of an image forming apparatus. For example, a sheet size sensor that detects the size of a sheet in a sheet feeding cassette and a sheet existence detection sensor are not provided, and an image forming apparatus that has received a print job executes the print job assuming that a sheet of a size designated by a user exists in the sheet feeding cassette.

However, even such an image forming apparatus has the above-mentioned function of detecting a sheet size error from the perspective of protection of a fixing portion. In a case where the size of a sheet that is actually fed and conveyed is smaller than a sheet size designated in a print job, the image forming apparatus displays a sheet size error and stops the print job. If a fixing process for a large-sized wide sheet is performed on a small-sized narrow sheet, the temperature at both ends of the fixing portion is not absorbed by the sheet, and therefore the temperature becomes abnormally high. This causes breakage of the fixing portion. In view of this, in a case where printing is performed on the assumption that a fixing process is performed on a wide sheet but an actual sheet is a narrow sheet, the printing is forcibly stopped, thereby preventing the abnormally high temperature and protecting the fixing portion. For example, in a case where a sheet of A5 size is stored in the image forming apparatus and where a user instructs the image forming apparatus to execute a print job for printing a sheet of A4 size, the sheet size (A4 size) in the print job is larger than the actual sheet size (A5 size, which is half of the A4 size), and therefore a sheet size error occurs.

Meanwhile, in software for print job often used in a hospital or the like, a print job can be created on the assumption that a sheet of A4 size is used, but there are cases where a sheet of A5 size is sufficient to print the contents of the print job. The contents of the print job are, for example, details of payment. A user of such software creates a print job for a sheet of A4 size by using a terminal device, but often places a sheet of A5 size in an image forming apparatus. If this user uses an image forming apparatus having the above-mentioned function of detecting a sheet size error, there arises a problem of frequent occurrence of a sheet size error. In order to cope with such a problem, software for completely disabling the function of detecting a sheet size error in an image forming apparatus has been released. However, if this software is available, there is a problem that a fixing portion is broken due to abnormally high temperature described above, and the original objective of protecting the fixing portion, which can be accomplished by the function of detecting a sheet size error, cannot be accomplished.

On the other hand, an image forming apparatus according to the present disclosure can improve user's convenience although the function of detecting a sheet size error is provided.

An image forming apparatus is described below as an example of an embodiment of the present disclosure. It should be noted that the image forming apparatus according to the present disclosure is, for example, a multifunction peripheral (MFP) having functions of a copy machine, a scanner, a printer, and the like.

As illustrated in FIG. 1, a multifunction peripheral 100 receives setting conditions of a print job from a user via an operation portion 101 and executes the print job by driving portions such as an image reading portion, an image forming portion, a conveyance portion, and a fixing portion.

The image reading portion reads image data of a document on a document table. The conveyance portion conveys a sheet of a sheet size corresponding to the setting conditions. The image forming portion transfers a toner image corresponding to the image data onto the sheet. The fixing portion fixes the toner image on the sheet. The sheet on which the toner image has been fixed is discharged as a printed material.

Figure 2:
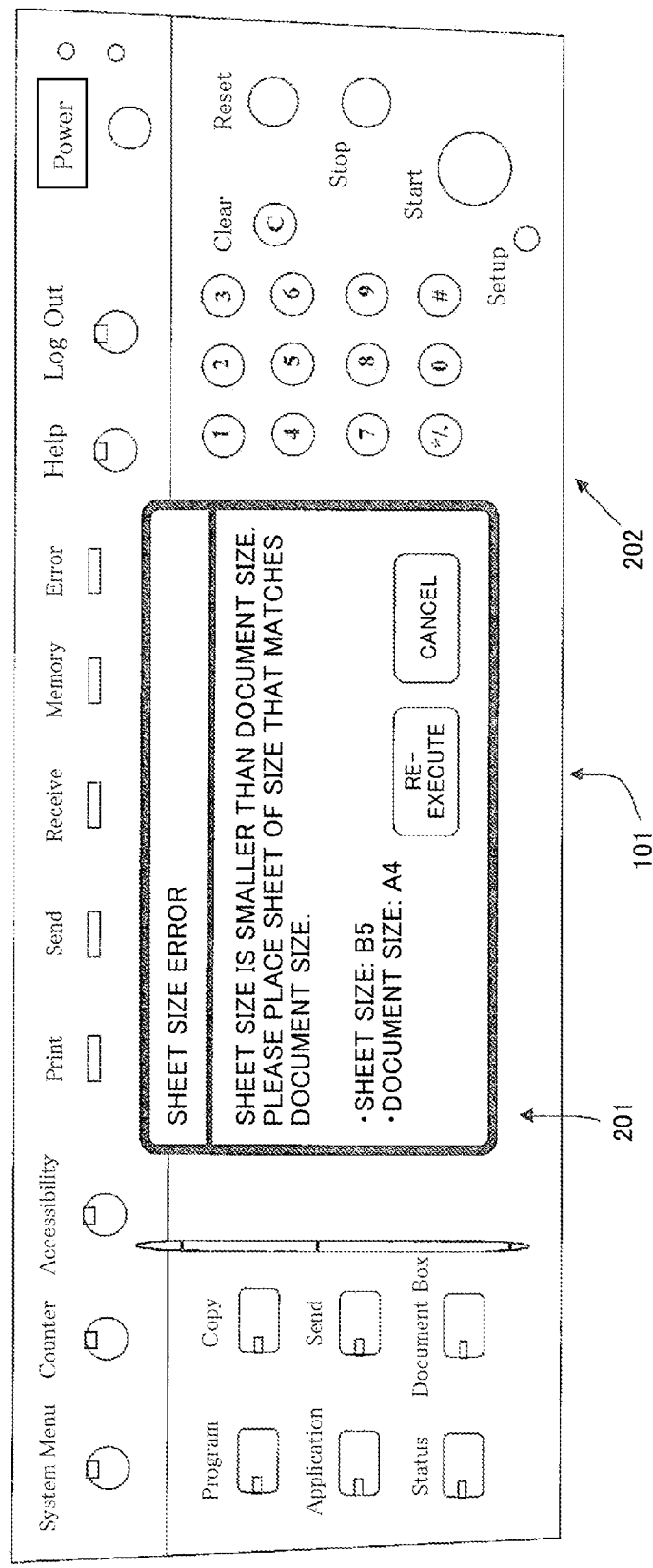
FIG. 2 is a diagram schematically illustrating an outline of an operation portion of the multifunction peripheral according to the embodiment of the present disclosure.

As illustrated in FIG. 2, the operation portion 101 has a touch panel 201 (operation panel) and operation keys 202. A user inputs a predetermined instruction by using the operation portion 101 or checks a predetermined operation screen. A predetermined screen is displayed on the touch panel 201. When a key within the screen displayed on the touch panel 201 is pressed, information corresponding to the pressed key is input. The operation keys 202 include, for example, a numerical keypad, a start key, a clear key, a stop key, a reset key, a power key, and the like.

Figure 3:
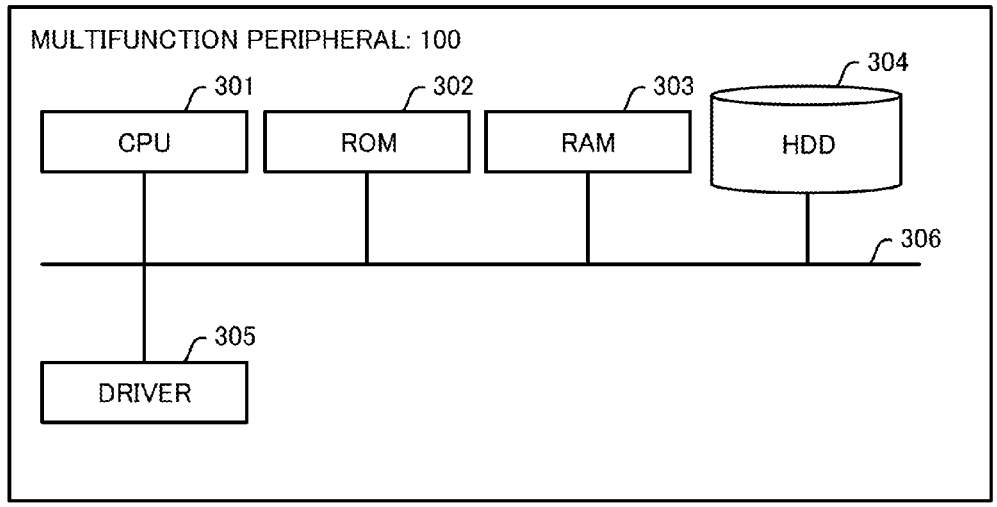
FIG. 3 is a diagram illustrating a configuration of control system hardware of the multifunction peripheral according to the embodiment of the present disclosure.

As illustrated in FIG. 3, in a control circuit of the multifunction peripheral 100, a Central Processing Unit (CPU) 301, a Read Only Memory (ROM) 302, a Random Access Memory (RAM) 303, a Hard Disc Drive (HDD) 304, and a driver 305 corresponding to each driven portion are connected by an internal bus 306.

The CPU of the multifunction peripheral 100, for example, uses the RAM as a working area, executes a program stored in the ROM, the HDD and the like, receives and gives data, an instruction, a signal, a command, or the like from the driver and the image reading portion 101 on the basis of the execution result, and controls operation of each driven portion illustrated in FIG. 1. Portions (see FIG. 4) that will be described later other than the driven portions are also realized by CPU's execution of programs. Programs and data for realizing the portions described below are stored in the ROM, the RAM, the HDD, and the like.

Figure 4:
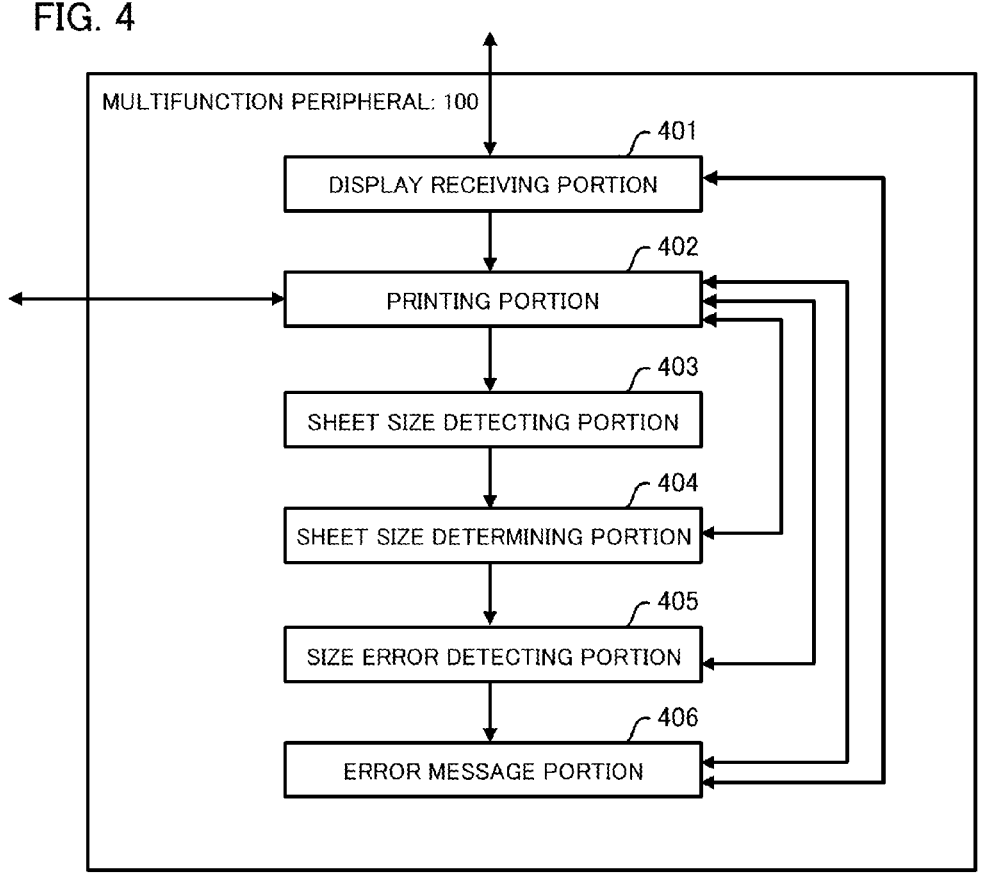
FIG. 4 is a functional block diagram of the multifunction peripheral according to the embodiment of the present disclosure.

Next, a configuration and an execution procedure according to the embodiment of the present disclosure are described with reference to FIGS. 4 and 5. First, when a user turns on the power of the multifunction peripheral 100, a display receiving portion 401 of the multifunction peripheral 100 displays an operation screen on the touch panel of the operation portion 101 and starts receiving a print job. The user places a document of A4 size on the document table and then inputs desired setting conditions (e.g., magnification 100%, sheet size A4). When the user selects the start key, the display receiving portion 401 receives the print job (FIG. 5: S101). Then, the display receiving portion 401 notifies a printing portion 402 of the reception of the print job, and the printing portion 402 which has received the notification starts execution of the print job (FIG. 5: S102).

When the printing portion 402 starts execution of the print job, the printing portion 402 uses the image reading portion to read image data of the document as raster image data for printing. Then, the printing portion 402 processes the raster image data on the basis of the setting condition (magnification 100%) and then causes the processed raster image data to be temporarily stored in a predetermined memory (e.g., the RAM). Furthermore, the printing portion 402 starts conveyance of a sheet stored in a sheet feeding cassette by using the conveyance portion. It should be noted that execution of the print job also means setting of a region of the raster image data, setting of a sheet conveyance speed, setting of processes in the portions such as charging and fixing, and the like.

Figure 5:
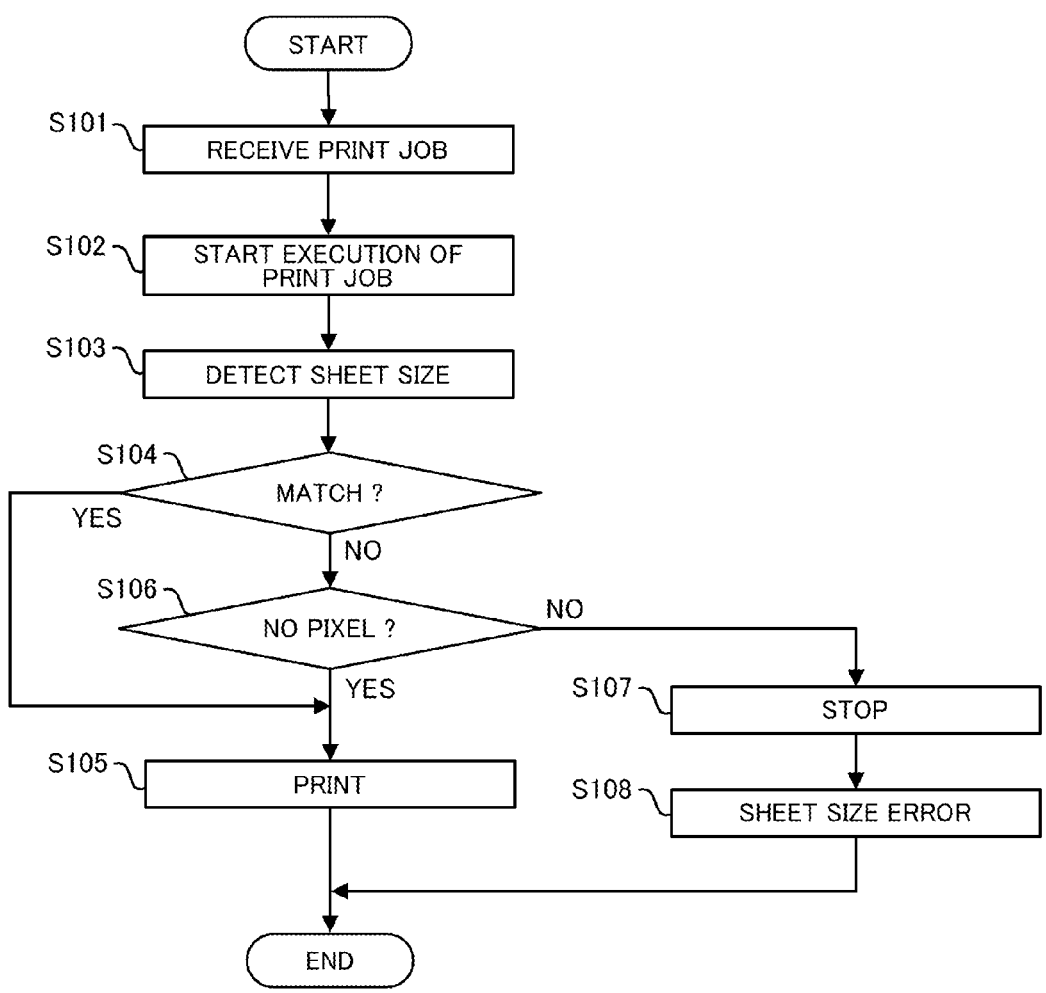
FIG. 5 is a flow chart illustrating an execution procedure according to the embodiment of the present disclosure.

When the printing portion 402 starts execution of the print job, the start of execution of the print job is notified to a sheet size detecting portion 403, and the sheet size detecting portion 403 which has received the notification detects a sheet size of a sheet conveyed in the print job (FIG. 5: S103).

A method of detection by the sheet size detecting portion 403 is not limited in particular. For example, a sheet feeding time from detection of a front end of the conveyed sheet to detection of a rear end of the sheet. Next, the sheet size detecting portion 403 calculates the size (m) of the sheet in a conveyance direction on the basis of the calculated sheet feeding time (sec) and a preset sheet conveyance speed (m/sec). Then, the sheet size detecting portion 403 refers to a sheet size table in which sizes of specified sheets in the conveyance direction are associated with sheet sizes (e.g., A4, A5). Furthermore, the sheet size detecting portion 403 checks the calculated size of the sheet in the conveyance direction against the sheet sizes in the conveyance direction in the referred sheet size table, and detects, as the sheet size of the conveyed sheet, a sheet size corresponding to the sheet size in the conveyance direction that matches the calculated size of the sheet in the conveyance direction.

When the sheet size detecting portion 403 completes detection, the completion of detection is notified to a sheet size determining portion 404, and the sheet size determining portion 404 which has received the notification determines whether or not a sheet size corresponding to the raster image data to be printed in the print job matches the detected sheet size (FIG. 5: S104).

A method of determination by the sheet size determining portion 404 is not limited in particular. For example, in a case where the sheet size of the document placed by the user is A4 and where the magnification of the image data selected in the print job is 100%, the sheet size of the document is used as a sheet size corresponding to the raster image data, and therefore the sheet size corresponding to the raster image data is A4. In a case where the sheet size of a sheet stored in the sheet feeding cassette of the multifunction peripheral 100 by the user is A4, the sheet size corresponding to the raster image data matches the detected sheet size. Therefore, the sheet size determining portion 404 determines that the sheet size corresponding to the raster image data matches the detected sheet size (FIG. 5: YES in S104) and then the result of determination is notified to the printing portion 402. The printing portion 402 which has received the notification causes the image forming portion to form a toner image corresponding to the raster image data during conveyance of the sheet. Then, the printing portion 402 transfers the toner image onto the sheet that is being conveyed, the fixing portion fixes the toner image on the sheet, and then the sheet is discharged as a printed material. This completes the print job.

Meanwhile, for example, in a case where the sheet size corresponding to the raster image data is A4 but a user who knows that the contents of the document (e.g., details of payment) fit in a half of the sheet size A4 places a sheet of A5 size in the sheet feeding cassette, the flow is as follows. Specifically, the sheet size determining portion 404 determines, as a result of the determination, that the sheet size corresponding to the raster image data does not match the detected sheet size (FIG. 5: NO in S104) and then the result of determination is notified to a size error detecting portion 405. The size error detecting portion 405 which has received the notification determines whether or not print pixels (data) that should be printed exists in an excess region of the raster image data that goes beyond the detected sheet size (FIG. 5: S106).

A method of determination by the size error detecting portion 405 is not limited in particular. According to an example illustrated in FIG. 6A, the sheet size corresponding to the raster image data is A4, and the sheet size of a sheet that is being conveyed is A5. Accordingly, a half (an upper half) of the raster image data can be formed on the sheet that is being conveyed, and the remaining half (a lower half) of the raster image data goes beyond the sheet size of the sheet that is being conveyed. Therefore, the size error detecting portion 405 refers to the remaining half of the raster image data as the excess region and determines whether or not the print pixels exist in the excess region. The print pixels mean, for example, pixels corresponding to a character written in black, red, or the like. In a case where it is determined that even a single print pixel exists in the excess region, the size error detecting portion 405 determines that the print pixel exists in the excess region (a size error is detected).

In a case where it is determined that print pixels exist only in the upper half of the raster image data and no print pixel exists in the lower half of the raster image data as illustrated in FIG. 6A (FIG. 5: NO in S106), the size error detecting portion 405 determines that no print pixel exists in the excess region and the result of determination is notified to the printing portion 402. The printing portion 402 which has received the notification continues execution of the print job and causes the image forming portion to form a toner image corresponding to the raster image data during conveyance of the sheet. In this case, the toner image corresponding to the raster image data includes no toner image in the excess region as illustrated in FIG. 6A. Then, the printing portion 402 transfers the toner image onto the sheet that is being conveyed, the fixing portion fixes the toner image on the sheet, and then this sheet is discharged as a printed material (FIG. 5: S105). In this way, even in a case where it is determined that the sheet size corresponding to the raster image data does not match the sheet size of the sheet that is being conveyed, i.e., in a case where it is determined that a sheet size error has occurred, printing can be continued as long as a toner image is not formed outside the sheet that is being conveyed. According to the present disclosure, it is therefore possible to prevent frequent occurrence of a sheet size error, thereby improving user's convenience, as compared with a conventional case where printing is always stopped upon occurrence of a sheet size error. Furthermore, according to the present disclosure, even in a case where the printing is continued, no toner image is formed outside the sheet, and therefore the fixing portion is not driven. It is therefore possible to accomplish the objective of protecting the fixing portion.

Figure 6B:
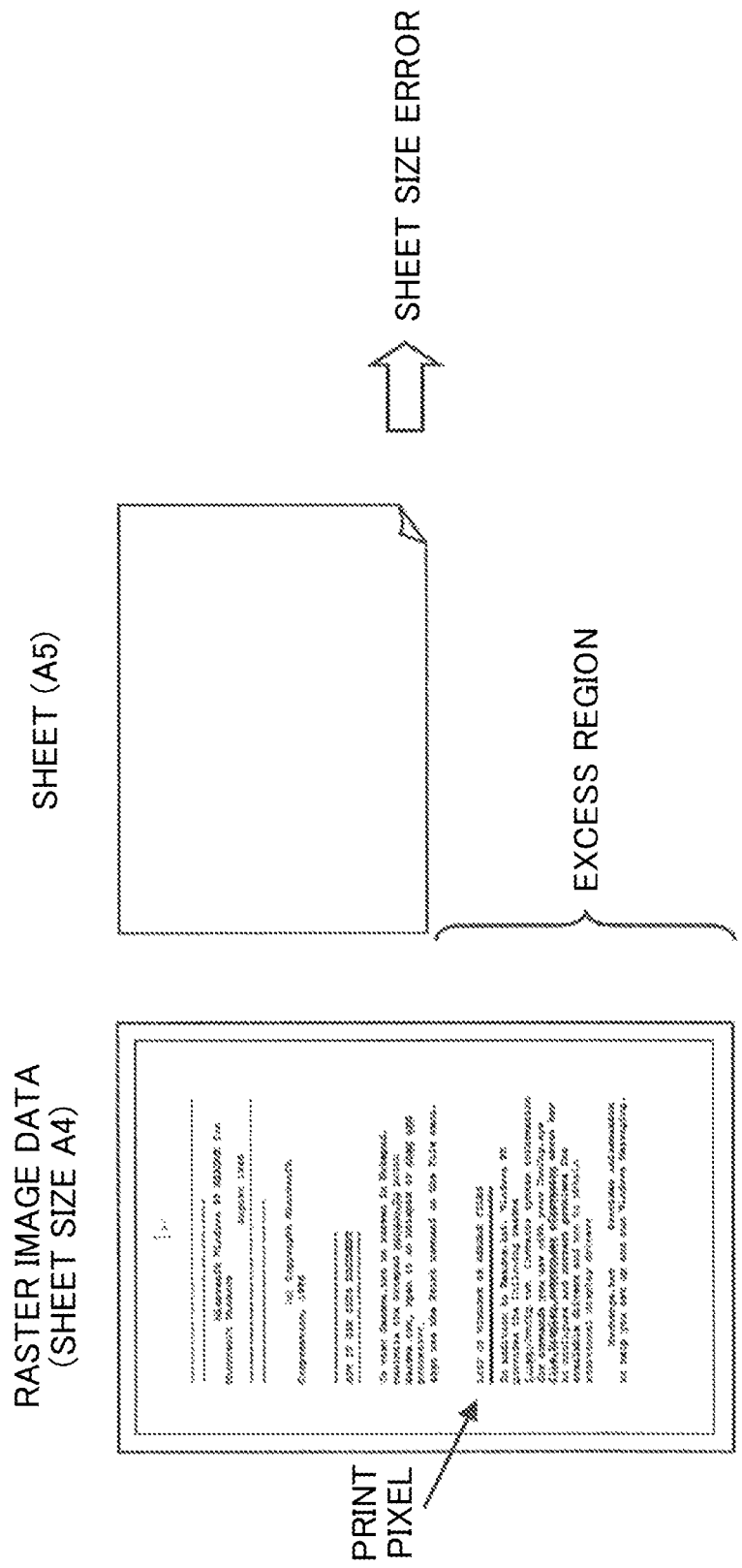
FIG. 6B is a diagram illustrating a relation between raster image data and a sheet in a case where a sheet size error occurs.

Meanwhile, in a case where the sheet size corresponding to the raster image data is A4, the sheet size of the sheet that is being conveyed is A5, and a print pixel exists in the entire region of the raster image data as illustrated in FIG. 6B (FIG. 5: YES in S106), the size error detecting portion 405 determines that a print pixel exists in the excess region and then the result of determination is notified to the printing portion 402. The printing portion 402 which has received the notification stops execution of the print job (FIG. 5: S107). Furthermore, the size error detecting portion 405 notifies an error message portion 406 of stoppage of execution of the print job. The error message portion 406 which has received the notification determines that a sheet size error has occurred in the print job (FIG. 5: S108) and then the display receiving portion 401 displays an error message screen.

On the error message screen, a message indicating a sheet size error, a message prompting the user to place a sheet of an appropriate sheet size, a document size (sheet size of raster image data) "A4", a sheet size "A5", a re-execution key, and a cancel key are displayed as illustrated in FIG. 2. For example, in a case where the user re-executes the print job, the user need only place an A4 sheet and select the re-execution key. In a case where the user cancels the printing itself, the user need only select the cancel key. In these case, a normal sheet size error procedure is performed.

In the embodiment of the present disclosure, the multifunction peripheral 100 includes the portions. However, it is also possible to employ a configuration provided with a non-transitory storage medium in which a program for realizing the portions is stored. According to the configuration, the program is read by an image reading device, and the portions are implemented by the image reading device. In this case, the program itself read out from the non-transitory storage medium exerts the operations and effects of the present disclosure. Alternatively, the present disclosure can be provided as a method for storing steps executed by the portions in a hard disk.

As described above, an image forming apparatus and an image forming method according to the present disclosure are useful for not only a multifunction peripheral, but also an image forming apparatus such as a copy machine or a printer, and are effective as an image forming apparatus and an image forming method that can improve user's convenience although a function of detecting a sheet size error is provided.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   a processor configured to execute:
   a sheet size determining portion configured to, upon start of execution of a print job:
      calculate a sheet size of a sheet conveyed in the print job on the basis of a preset sheet conveyance speed and a sheet feeding time measured by using an optical sensor provided on a sheet conveyance path; and
      determine whether or not a sheet size corresponding to raster image data to be printed in the print job matches the sheet size of the sheet;
   a size error detecting portion configured to determine, in a case where the sheet size corresponding to the raster image data does not match the sheet size of the sheet, whether or not a print pixel to be printed, corresponding to a written character, exists in an excess region of the raster image data that is outside the sheet size of the sheet; and
   a printing portion configured to continue execution of the print job in a case where no print pixel exists in the excess region even in the case where the sheet size corresponding to the raster image data does not match the sheet size of the sheet, and stop the print job in a case where the print pixel exists in the excess region, wherein
   the printing portion reads the raster image data to be printed in the print lob and processes the raster image data on a basis of a setting condition input by a user operation, and
   the sheet size determining portion determines whether or not the sheet size corresponding to the raster image data processed by the printing portion matches the sheet size of the sheet conveyed in the print job.

2. The image forming apparatus according to claim 1, wherein the processor is further configured to execute an error message portion configured to display an error message screen in the case where the print pixel exists in the excess region.

3. The image forming apparatus according to claim 1, wherein
   in a case where the sheet size of the sheet is a half of the sheet size corresponding to the raster image data, the size error detecting portion determines whether or not the print pixel exists in the excess region that is a lower half of the raster image data.

4. An image forming method comprising:
   a first step of, upon start of execution of a print job, reading raster image data to be printed in the print job, processing the raster image data on a basis of a setting condition input by a user operation, calculating a sheet size of a sheet conveyed in the print job on the basis of a preset sheet conveyance speed and a measured sheet feeding time, and determining whether or not a sheet size corresponding to the raster image data matches the sheet size of the sheet;
   a second step of determining, in a case where the sheet size corresponding to the raster image data does not match the sheet size of the sheet, whether or not a print pixel to be printed, corresponding to a written character, exists in an excess region of the raster image data that is outside the sheet size of the sheet;
   a third step of continuing execution of the print job in a case where no print pixel exists in the excess region even in the case where the sheet size corresponding to the raster image data does not match the sheet size of the sheet; and
   a fourth step of stopping the print job in a case where the print pixel exists in the excess region, in the case where the sheet size corresponding to the raster image data does not match the sheet size of the sheet.

5. The image forming method according to claim 4, further comprising a fifth step of displaying an error message screen in the case where the print pixel exists in the excess region.

6. The image forming method according to claim 4, wherein
   in the second step, in a case where the sheet size of the sheet is a half of the sheet size corresponding to the raster image data, it is determined whether or not the print pixel exists in the excess region that is a lower half of the raster image data.

* * * * *